United States Patent [19]

Matsuda

[11] Patent Number: 4,982,094

[45] Date of Patent: Jan. 1, 1991

[54] PASSIVE TYPE CRIME-PREVENTING INFRARED SENSOR PROVIDED WITH A MECHANISM OF MONITORING AN OBSTRUCTION FOR THE VISUAL FIELD

[75] Inventor: Kazuhisa Matsuda, Uji, Japan

[73] Assignee: Takenaka Engineering Co., Ltd., Kyoto, Japan

[21] Appl. No.: 210,731

[22] PCT Filed: Oct. 30, 1987

[86] PCT No.: PCT/JP87/00844

§ 371 Date: Jun. 23, 1988

§ 102(e) Date: Jun. 23, 1988

[87] PCT Pub. No.: WO88/03301

PCT Pub. Date: May 5, 1988

[30] Foreign Application Priority Data

Oct. 31, 1986 [JP] Japan ............................... 61-168047

[51] Int. Cl.[5] ........................... G01J 5/14; G01J 5/10; G01J 5/56

[52] U.S. Cl. ..................................... 250/342; 250/339

[58] Field of Search ................ 250/339, 342; 340/556, 340/567, 506

[56] References Cited

U.S. PATENT DOCUMENTS 4,005,289 1/1977 Del Grande ..................... 250/339 X
4,479,056 10/1984 Zierhut ................................ 250/342
4,745,284 5/1988 Masuda et al. ................. 250/342 X
4,752,768 6/1988 Steers et al. .................... 250/342 X
4,799,243 1/1989 Zepke ............................ 250/342 X

FOREIGN PATENT DOCUMENTS 55-146583 10/1980 Japan .
57-198691 12/1982 Japan .

OTHER PUBLICATIONS

Aumann et al., "Infrared Multidetector Spectrometer for Remote Sensing of Temperature Profiles in the Presence of Clouds", Applied Optics, vol. 15, No. 9 (Sep. 76) pp. 2091–2094.

*Primary Examiner*—Constantine Hannaher
*Assistant Examiner*—Jacob M. Eisenberg
*Attorney, Agent, or Firm*—Morgan & Finnegan

[57] ABSTRACT

The disclosure relates to a crime-preventing infrared sensor of a passive type in which the infrared detecting element 6 detects the energy of infrared rays radiated from an object in a predetermined visual field to be monitored and an alarm is given in response to a detection signal outputted from the infrared detecting element. The crime-preventing infrared sensor comprises an infrared detector 7 for detecting a human body or any other object approaching the sensor itself independently of an object-detecting function in a visual field, whereby the obstruction in the visual field of the object-detecting function is prevented.

3 Claims, 3 Drawing Sheets

FIG.6(a)
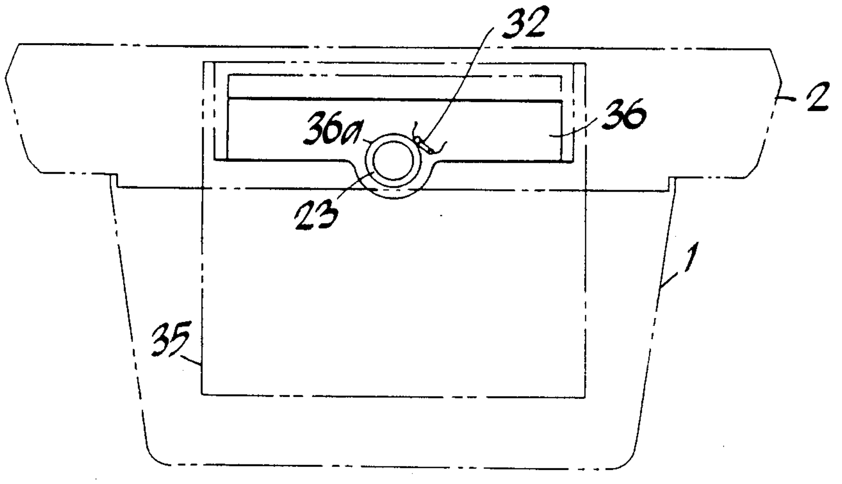
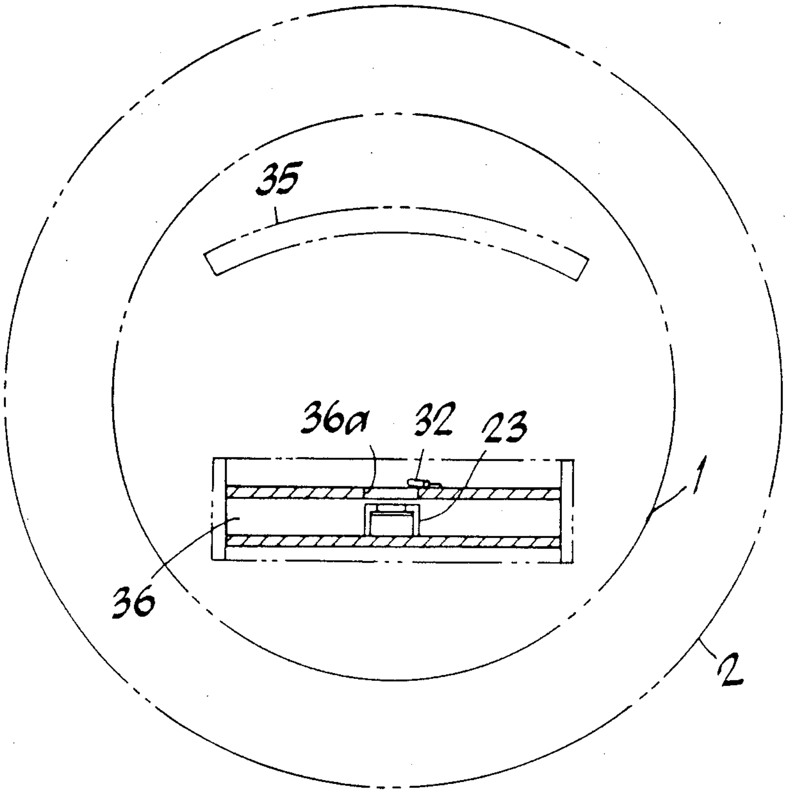
FIG. 6(b)

PASSIVE TYPE CRIME-PREVENTING INFRARED SENSOR PROVIDED WITH A MECHANISM OF MONITORING AN OBSTRUCTION FOR THE VISUAL FIELD

TECHNICAL FIELD

The present invention relates to a crime-preventing infrared sensor, and more particularly, to a passive type crime-preventing infrared sensor provided with a mechanism for monitoring an obstructor or an obstruction in the visual field to be detected.

BACKGROUND ART

A crime-preventing infrared sensor of the passive type introduces infrared rays incident on a monitoring window serving as the cover thereof into an infrared detecting means such as a pyroelectric element through an optical system such as a reflecting mirror, and detects an intruder by amplifying and distinguishing a signal outputted from the pyroelectric element, thereby giving an alarm. In principle, the sensor detects an intruder by detecting a sudden change of infrared rays incident on the pyroelectric element, thus generating an output. Therefore, if the optical system through which infrared rays pass and is incident on the pyroelectric element fails, for example, if the monitoring window is shielded or if the reflecting mirror is dislocated, the infrared rays radiated from the intruder cannot be detected, that is, the sensor does not function. In addition, when the infrared detecting means or the signal processing circuits provided with the sensor fails, the sensor does not function either. In order to detect an abnormality which occurs in the infrared detecting means or the signal processing circuits, Japanese Utility Model Laying-Open Publication No. 60-104993 discloses a method for self-diagnosing such an abnormality. According to this method, an infrared emitting source is provided in a sensor so as to perform a self-diagnosis by irradiating infrared rays to an infrared detecting means provided in the sensor. However, a mechanism for effectively monitoring the abnormality of the optical system such as an obstruction thereof in particular has not been provided.

The reason for requiring a mechanism of effectively monitoring the abnormality of the optical system provided with the crime-preventing infrared sensor is as follows: This type of a crime-preventing system operates ordinarily at night and holidays when there is none in charge in an institution or the like, whereas the signal processing circuits of the sensor, preferably, does not receive a signal from the infrared detecting means when there are persons in charge in the institution or the like. Thus, a preliminary intruder who approaches the sensor can obstruct the visual field of the sensor, for example, he can optically shield the window of the sensor. In order to solve this problem, the inventors have recently developed a system for monitoring the abnormality of the optical system of the sensor of this type. According to the system, the visual field of an infrared detecting element is shifted from the ordinarily monitoring field to a different visual field as the reference visual field or the window of the sensor is forcibly shielded with a surface-masking element, whereby the probable change of the output from the infrared detecting element is measured. If there is no substantial change in the output, the sensor decides that an abnormality has occurred and gives an alarm. That is, the sensor decides that the visual field of the window is already in a condition similar to the reference visual field or masked so that infrared rays are prevented from passing the window, or the visual field has been substantially obstructed. However, this method cannot be performed unless a masked state of the window is different in a certain extent from the visual field to be monitored in a normal period when the infrared rays are being monitored by the sensor.

DISCLOSURE OF INVENTION

It is an object of the invention to provide a mechanism for effectively monitoring any approaching body to the sensor so that an abnormality which occurs in the periphery of a crime-preventing infrared sensor of a passive type, such as, in particular, the obstruction of the visual field of the sensor is monitored.

In order to achieve the above-described object, a passive type sensor in accordance with the invention having a means for detecting the infrared energy emitted from an object in a predetermined visual field to be monitored and an alarm circuit means for generating an alarm in response to the detection signal outputted from the detecting means comprising a second detecting means for detecting an intruder or an object approaching the sensor independently of the means for detecting an object in the visual field, whereby the obstruction of the visual field applied to the first detecting means is monitored.

A crime-preventing infrared sensor of a passive type in accordance with the invention is further provided with a second alarm circuit means for giving an alarm in response to the signal from the second detecting means independently of the alarm circuit means which responds to a detecting signal from the first detecting means, whereby when the obstruction of the visual field is detected, an alarm or a switching suitable for preventing the obstruction of the visual field is carried out not by an alarm to be given when an intruder is detected.

FIGS. *6a* and *6b* are front view showing the positional relationship between the heat source of a self-diagnosing circuit and an infrared detecting element provided with a crime-preventing infrared sensor of the passive type of the invention.

BEST MODE FOR CARRYING OUT THE INVENTION

Figure 1:
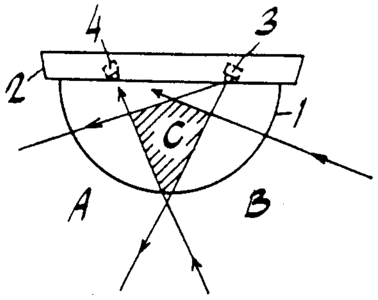
FIG. 1 is a front view showing schematically a first embodiment of the invention.

Referring to FIG. 1 showing a first embodiment of the invention, a crime-preventing infrared sensor of the passive type (hereinafter only referred to as sensor) comprises a cover 1 through which infrared rays pass, a disk-shaped case 2, an infrared emitting element 3, and an infrared receiving element 4, arranged in the flange or peripheral frame of the case 2, for monitoring an intruder or an object approaching the sensor. Specifically describing, infrared rays irradiated from the infrared emitting element 3 progress in a scope (A) along the periphery of the cover 1. The light receiving scope (B) of the infrared receiving element 4 crosses the scope (A) along the periphery of the cover 1 as shown by oblique lines. The sensor detects an object present at a position corresponding to the cross portion (C). Though not shown, an element for detecting an intruder mounted in the case 2 detects infrared rays which have been radiated from the intruder to the front of the cover 1 by way of the cross portion (C) upwards diagonally and transmitted through the cover 1. Therefore, the sensor will not perform its function if the surface of the cover 1 corresponding to the cross portion (C) is shielded, for example, with a light-shielding material. However, when the infrared emitting element 3 and the infrared receiving element 4 are in operation, the sensor is capable of detecting such an operation because the infrared rays emitted from the infrared emitting element 3 are reflected from the hands of such an obstructor or his tools and incident on the infrared receiving element 4.

Figure 2:
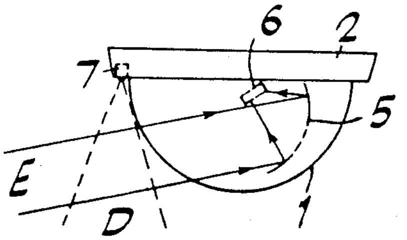
FIG. 2 is a side elevational view showing schematically a second embodiment of the invention.
Figure 3:
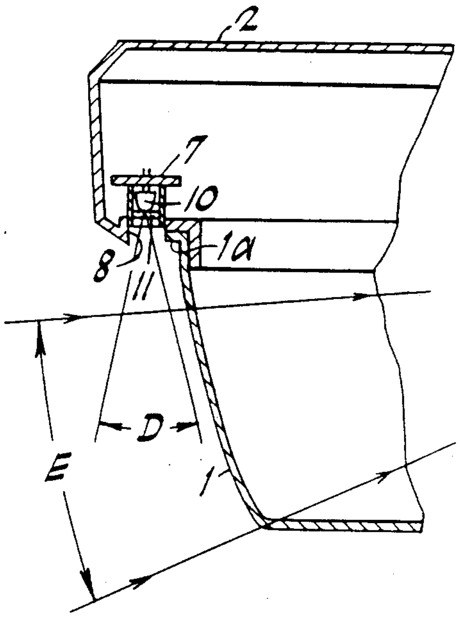
FIG. 3 is an enlarged sectional view of principal portions in FIG. 2.
Figure 4:
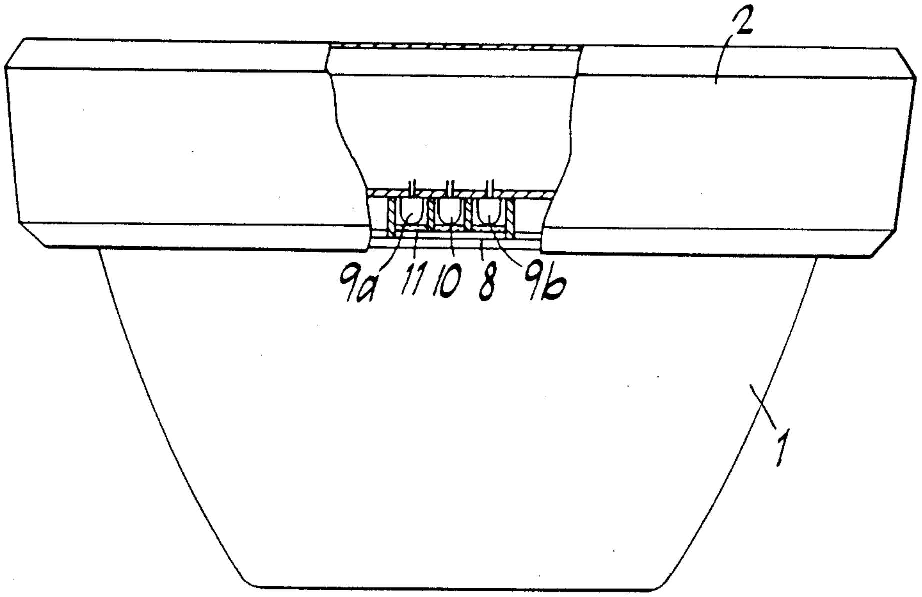
FIG. 4 is an partially enlarged cut-away front view showing the second embodiment shown in FIG. 2.

A second embodiment of the invention is described hereinbelow with reference to FIG. 2. In this embodiment, infrared emitting and infrared receiving elements are so mounted in the flange of the case 2 that the substantially overlapped light emitting and receiving fields (D) of the infrared emitting and infrared receiving elements for monitoring an approaching body substantially crosses an intruder detecting field (E) from the upper side thereof. Specifically, the sensor of this embodiment comprises a reflecting mirror 5 which is mounted in the cover 1 and adapted to focus and reflect infrared rays transmitted from the intruder, an infrared detecting element 6 for detecting the infrared rays focused by the reflecting mirror 5, and an array 7 of the infrared elements for monitoring an approaching body. As shown in FIGS. 3 and 4, the array 7 of infrared elements comprises a pair of infrared emitting elements 9*a* and 9*b* and an infrared receiving element 10 disposed therebetween arranged in a line provided on an IC-containing block mounted in an element-arranging opening 8 disposed in the peripheral edge of the case 2 and supported by the case 2. The array 7 of the infrared elements is covered with a visible light-blocking filter 11. In this embodiment, the infrared receiving element 10 composed of a photodiode also generates an output when pulse-modulated infrared rays emitted from the infrared emitting elements 9*a* and 9*b* composed of infrared LEDs are reflected from an approaching body and incident on the infrared receiving element 10. It is noted that the two infrared emitting elements 9*a* and 9*b* are provided to increase the amount of infrared rays twice the amount by a single element and make them uniform in a region to be detected. Since a visible light-blocking filter 11 is mounted on the front of the case 2, the sensor is not affected by disturbance lights except the detecting infrared rays. Further, the array 7 of the infrared elements is disposed deep from the contour of the peripheral edge of the case 2 so as not to be conspicuous.

According to the system of the second embodiment, if the infrared receiving element or the infrared emitting element is covered with an opaque tape for obstructing the obstruction-monitoring mechanism from normally functioning, such an obstruction can be easily detected by the sensor because an object approaching the sensor reflects infrared rays to the infrared receiving element. Further, a spray application to the cover 1 can be more reliably detected than in the first embodiment. In addition, though it is rather difficult to detect the removal of the cover 2 in the first embodiment, such an obstruction can be reliably detected in this embodiment because the sensor detects the reflection of infrared rays which occur at the peripheral edge 1*a* of the cover 1.

Figure 5:
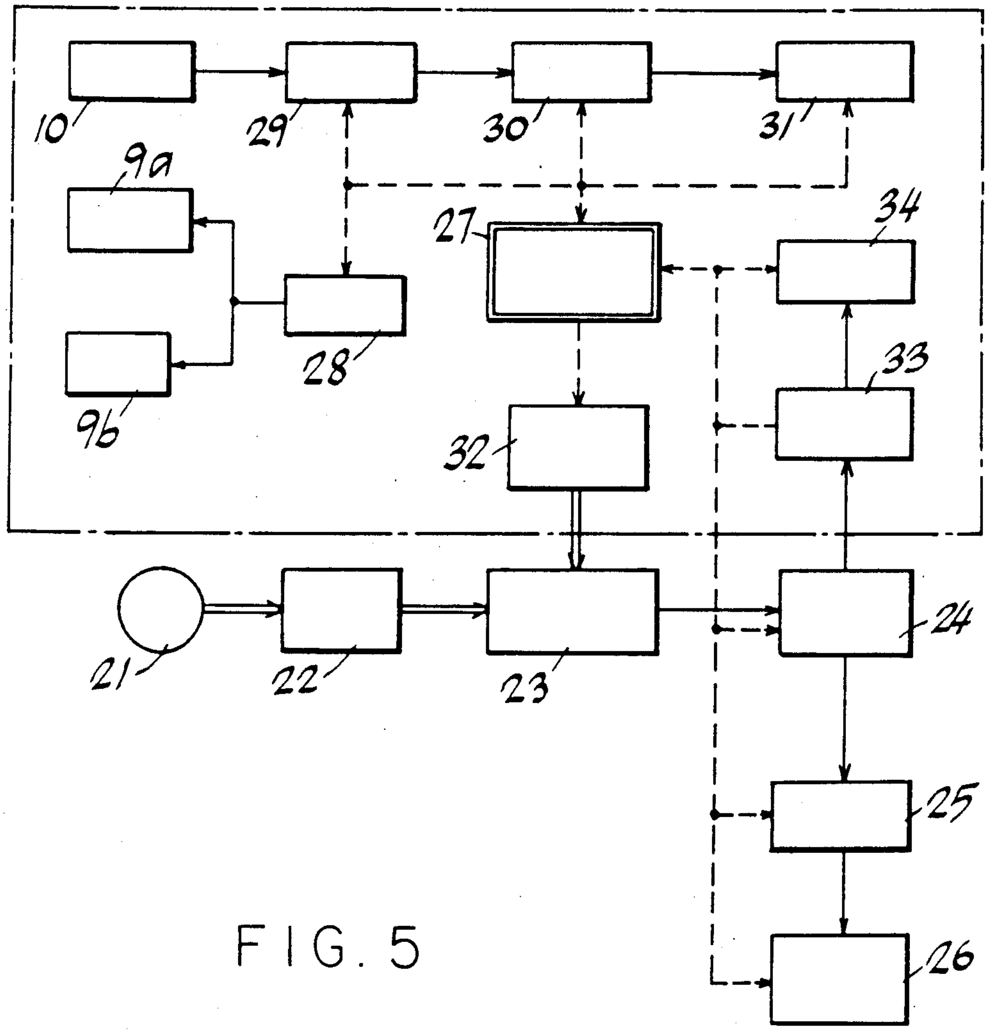
FIG. 5 is a block diagram showing the electric circuit of the invention.

FIG. 5 shows the electric circuit of the sensor provided with an obstruction-monitoring arrangement and a self-diagnosis arrangement for diagnosing the infrared detecting elements and a signal processing circuits to which the signal outputted from the infrared detecting element is applied. Referring to FIG. 5, circuits enclosed by a chain line is the portion for monitoring an obstruction and performing a self-diagnosis. The circuits provided outside the chain line give an alarm when an intruder approaches the sensor. The function of the sensor is performed by a window 21, an optical system 22, an infrared detecting unit 23, an amplifier 23, a decision section 25, and a first alarm circuit 26. These circuits are operated by a control section 27 shown in the chain line 20. In the second embodiment of the invention as shown in FIGS. 2, 3 and 4, a peripheral diagnosing circuit which functions as an obstruction monitoring part includes the infrared emitting elements 9*a*, 9*b*, and the infrared receiving element 10. In this case, the infrared emitting elements 9*a* and 9*b* are energized by an oscillator 28, and a detection signal outputted from the infrared receiving element 10 is amplified by an amplifier 29 and it is decided by a decision section 30 whether or not the signal is a noise. Thereafter, an alarm circuit 31 is driven. A control section 27 synchronizes the oscillator 28 and the amplifier 29 and actuates the obstruction-monitoring circuit in the obstruction-monitoring time except when the infrared detecting element 23 is monitoring an intruder. The control section 27 also controls a heat source 32, a decision section 33, and a third alarm circuit 34 constituting the self-diagnosing circuit. The heat source 32 is a heating element having an electric resistance and disposed adjacent to the infrared detecting element 23. The decision section 33 and the alarm circuit 34 generate an alarm of the abnormal condition of the infrared detecting element 23 or an associated circuit portion when the infrared detecting element 23 or the amplifier 24 does not produce the detection signal of infrared rays from the heat source 32 which has been actuated.

The heat source 32 and the infrared detecting element 23 are arranged as shown in FIG. 6(*a*) and FIG. 6(*b*). The infrared detecting element 23 facing the reflecting mirror 35 in the case 2 is supported by the block 36 containing the integrated circuit. The heat source 32 consisting of the resistor is disposed at the edge of an opening 36*a* corresponding to the light-receiving face of the infrared detecting means supported by the block 36 at the surface thereof. It is apparent from this arrangement that the heat source 32 is effectively capable of irradiating infrared rays to the infrared detecting element 23 without shielding infrared rays radiated from an intruder.

In the above-described embodiment, it is possible that the decision circuit 25 and the alarm circuit 26 provided in the circuit for performing the function of detecting an intruder may also be operated as the other decision sections and alarm circuits as necessary. The first alarm circuit 26 is used to generate a relay contact output for driving crime-preventing equipments in an institution or the like. The second alarm circuit 31 and the third alarm circuit 34 are used to notice an abnormality to a monitoring room and allow the sensor to generate a buzzer.

INDUSTRIAL APPLICABILITY

As described hereinabove, the crime-preventing infrared sensor of the passive type in accordance with the invention is capable of detecting various kinds of obstructions applied to the detective field outside the cover thereof. Therefore, a very reliable crime-preventing apparatus can be provided using the sensor. Further, the sensor is utilized as a reliable crime-preventing system because the sensor is provided with means for detecting the failure of the electric circuits to which the information of the infrared detecting element is transmitted.

What is claimed is:

1. A passive-type, crime-preventing infrared sensor, comprising:

first detecting means for detecting infrared radiation from an object in a visual field to be monitored;

a first electrical alarm circuit means for providing an alarm in response to detection of a signal output from said first detecting means;

second detecting means for detecting infrared radiation from an object approaching said first detecting means independently of said first detecting means, thereby detecting an obstruction of said first detecting means; and a second alarm circuit means for providing an alarm response to detection of a signal from said second detecting means, said second alarm circuit being electrically isolated from said first alarm circuit.

2. A passive-type, crime-preventing infrared sensor as claimed in claim 1, wherein said second detecting means comprises an infrared source for radiating infrared radiation in a direction in which the infrared radiation crosses the visual field to be monitored by said first detecting means and an infrared detector for detecting the reflected amount of the infrared radiation from said infrared source disposed adjacent to said infrared source.

3. A passive-type, crime-preventing infrared sensor as claimed in claim 1, wherein a heat source is provided adjacent to said first detecting means to check said detecting means and electric circuits connected thereto.

* * * * *